United States Patent [19]
Ravetti

[11] Patent Number: 5,134,470
[45] Date of Patent: Jul. 28, 1992

[54] OPTICAL FIBER INTERCONNECTIONS AND METHOD OF FORMING SAME

[75] Inventor: Robert G. Ravetti, Rancho Palos Verdes, Calif.

[73] Assignee: Hughes Aircraft Company, Los Angeles, Calif.

[21] Appl. No.: 712,765

[22] Filed: Jun. 10, 1991

[51] Int. Cl.$^5$ .................. G02B 6/26; C03B 23/20; B65H 69/02
[52] U.S. Cl. ..................... 385/98; 385/70; 385/97; 385/99; 65/4.2; 65/4.3; 156/158; 156/166
[58] Field of Search ............ 350/96.15, 96.17, 96.20, 350/96.21, 96.22, 320; 65/4.1, 4.2, 4.3; 385/95, 97, 98, 99, 55, 70; 156/158, 166

[56] References Cited

U.S. PATENT DOCUMENTS

| | | | |
|---|---|---|---|
| 3,674,914 | 7/1972 | Burr | 156/166 |
| 3,768,146 | 10/1973 | Braun et al. | 385/98 |
| 3,919,037 | 11/1975 | Miller | 385/98 |
| 4,033,668 | 7/1977 | Presby | 385/95 |
| 4,057,448 | 11/1977 | Miller | 385/95 |
| 4,261,644 | 4/1981 | Giannaris | 385/99 |
| 4,290,668 | 9/1981 | Ellis et al. | 385/85 |
| 4,404,010 | 9/1983 | Bricheno et al. | 65/4.2 |
| 4,580,874 | 4/1986 | Winter et al. | 385/99 |
| 4,702,547 | 10/1987 | Enochs | 385/88 |
| 4,707,065 | 11/1987 | Jenkins | 385/138 |
| 4,746,189 | 5/1988 | Arrington et al. | 385/99 |
| 4,807,959 | 2/1989 | Berkey | 385/98 X |
| 4,810,277 | 3/1989 | Waitl et al. | 65/4.21 |
| 4,919,510 | 4/1990 | Hoke et al. | 385/98 X |
| 4,921,323 | 5/1990 | Delahanty et al. | 385/98 |
| 4,931,076 | 6/1990 | Berkey | 65/4.2 |
| 4,964,689 | 10/1990 | Wichansky | 385/95 |
| 4,995,728 | 2/1991 | Finzel | 385/98 |
| 5,000,537 | 3/1991 | Saito et al. | 385/55 |
| 5,009,692 | 4/1991 | Miller et al. | 385/95 |
| 5,018,821 | 5/1991 | Kurata | 385/95 |
| 5,024,505 | 6/1991 | Junji et al. | 385/97 |
| 5,061,034 | 10/1991 | Fujikawa et al. | 385/95 |

*Primary Examiner*—Brian Healy
*Attorney, Agent, or Firm*—M. E. Lachman; W. J. Streeter; W. K. Denson-Low

[57] ABSTRACT

Optical interconnectors and methods for optically interconnecting structures, such as printed circuit boards. The optical interconnectors comprise at least two optical fibers having one end embedded in a structure such as a printed circuit board and at least one sleeve for housing termination portions of two optical fibers. The termination portions of the fibers are positioned and secured within the sleeve so that end surfaces of the optical fibers are abutted together. The resulting optical interconnectors have low loss and occupy a small amount of space while maintaining a flat profile.

31 Claims, 1 Drawing Sheet

OPTICAL FIBER INTERCONNECTIONS AND METHOD OF FORMING SAME

BACKGROUND OF THE INVENTION

1. Field of the Invention

The present invention relates in general to interconnections for connecting interactive components of electronic devices. More particularly, the present invention relates to apparatus and methods for optically interconnecting printed circuit boards by connecting optical fibers having one end embedded in the printed circuit boards.

2. Description of Related Art

Optical fibers are finding increased utility within the electronics and communications industry as a means for transferring data. Additionally, optical fibers are used extensively for directly sensing temperature and pressure in a wide range of applications. In this capacity, the ability of optical fibers to attenuate transmitted radiation in response to changes in temperature and pressure is exploited to fabricate temperature and pressure sensors. The optical fiber sensors are suitable for use in virtually any application in which temperature and pressure sensors are utilized. Such applications range from analytical instrumentation requiring temperature and pressure control to automotive and aerospace use.

One emerging aerospace use for optical fiber sensors is in the field of "smart skins". In this application, optical fiber sensors are placed in an array along aircraft wing skins to sense pressure variations at specific wing locations. Based upon the pressure sensed at these locations, feedback mechanisms which are electronically connected to the optical fiber sensors control aircraft wing configuration parameters. This application and other similar uses of optical fibers frequently require large numbers of printed circuit boards which are functionally interactive. Moreover, individual optical fibers typically have one end embedded in one of the printed circuit boards and the opposite end is connected to another optical fiber which in turn has one end embedded in a printed circuit board. It is not unusual for a single system to have an extremely large number of optical interconnections between optical fibers.

It is crucial that the optical interconnections between the optical fibers do not contribute to signal loss. It is also crucial that the connected optical fibers are well aligned. This is particularly true for pressure sensors in which very small microbending attenuation changes are being detected over the total range of expected pressure changes. Optical interconnectors which are currently used in the industry generally provide low loss connections. However, many of these interconnectors require a large amount of space. One such connector is the standard snap-in type. These are configured much like a mechanical pencil and require bulky packaging to effectively fabricate an interconnection which is integral with the optical fiber system and which is also easy to connect and disconnect.

Another type of optical interconnector consists of grooves which are etched in a silicon wafer with the optical fibers held in place in the grooves with epoxy adhesive. This configuration can also require a large amount of space and the fibers are not well secured, which can cause a loss in the integrity of the interconnection. A third type of currently utilized optical interconnection is prepared by simply butting the ends of two or more glass fibers and melting the ends together to form a permanent connection. Fibers which are connected using this technique are not easily disconnected and then reconnected. Additionally, these interconnections provide no means for protecting the optical fibers at the connecting location.

It would be desirable therefore to provide a means for optically connecting printed circuit boards having embedded optical fibers, wherein the resulting optical interconnection has low loss and lies flat without bulky packaging which requires a large amount of space. It would also be desirable to provide a means for optically connecting printed circuit boards having embedded optical fibers, wherein the resulting optical interconnection can be easily disconnected and reconnected and the optical fibers are sufficiently supported to provide a reliable interconnection.

SUMMARY OF THE INVENTION

In accordance with the present invention, an optical interconnection is provided which has low loss and occupies a small amount of space, while maintaining a flat profile. Additionally, the optical interconnection of the present invention allows for conveniently disconnecting and reconnecting connected optical fibers which remain well aligned and functionally reliable while connected.

In accordance with the present invention, optical interconnections are provided for connecting optical fibers having an end surface and a termination portion adjacent to the end surface. The interconnection comprises a sleeve having an inner surface which defines an optical fiber connection zone for housing the termination portion of the optical fibers. The optical fiber end surfaces are abutted together within the optical fiber connection zone. A means for securing the optical fiber termination portions within the optical fiber connection zone is also provided.

Typically the optical fibers utilized in the present invention are metal coated glass fibers having a solderable metal surface coating on the termination portion. The securing means is accomplished by a tack solder between the termination portion of the optical fiber and the sleeve.

As a feature of the present invention, the optical interconnection can further include a support means for securing the sleeve and the adhered optical fiber termination portion. The support means is preferably a thick metal foil having elongated grooves for receiving the sleeve.

The optical interconnections of the present invention are advantageously useful for connecting large numbers of optical fibers in a small amount of space. Thus, large numbers of sleeves housing optical fibers can be positioned on a single metal foil and several printed circuit boards having embedded optical fibers can be connected without the use of bulky connector packages.

In accordance with the present invention, optical interconnectors can be prepared by providing optical fibers having an end surface and a termination portion adjacent to the end surface. The next steps include positioning the optical fiber termination portions within a connection zone of a sleeve so that the optical fiber end surfaces are abutted together, and then adhering the termination portions to the sleeve.

The above-discussed and many other features and attendant advantages of the present invention will become apparent as the invention becomes better understood by reference to the following detailed description when considered in conjunction with the accompanying drawings.

DESCRIPTION OF THE PREFERRED EMBODIMENTS

The present invention provides optical interconnections for reliably connecting optical fibers without the use of bulky packaging. Because the optical interconnections of the present invention lie flat and require little space, they are primarily intended for connecting large numbers of optical fibers which are embedded in a number of printed circuit boards. Those skilled in the art will appreciate, however, that the optical interconnections of the present invention can be used in any application in which optical fibers are connected together.

Figure 1:
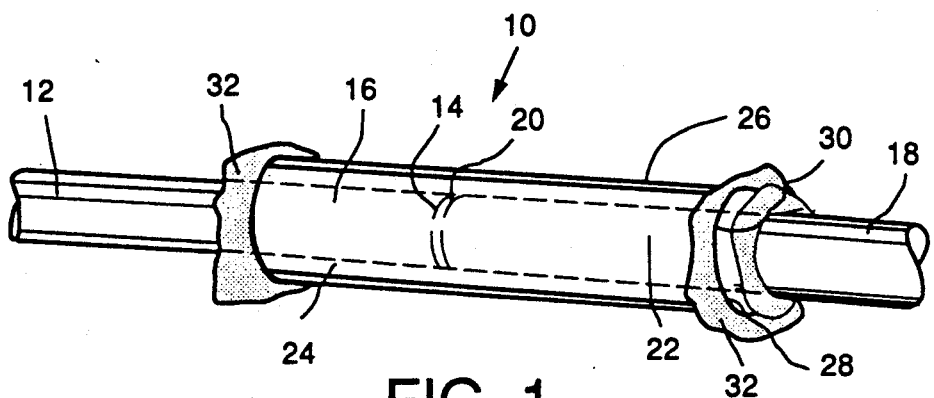
FIG. 1 is a representation of an optical interconnection in accordance with the present invention showing two optical fiber end surfaces abutted together and housed in a sleeve.

FIG. 1 illustrates an exemplary optical interconnection 10 according to the present invention. The optical interconnection 10 includes a first optical fiber 12, having at least one end surface 14 and a termination portion 16 adjacent to the end surface 14. The optical interconnection 10 further includes a second optical fiber 18 having at least one end surface 20 and a termination portion 22 adjacent to the end surface 20. A sleeve 24 has an outer surface 26 and an inner surface 28, the inner surface 28 defines an optical fiber connection zone 30 wherein the termination portions 16 and 22 of the first and second optical fibers, respectively, are housed. The first and second optical fiber end surfaces 14 and 20 are abutted together within the optical fiber connection zone 30. Adhesive or solder 32 provides a means for securing the optical fiber termination portions 16 and 22 within the optical fiber connection zone 30.

Any type of optical fiber can be utilized in accordance with the teachings of the present invention. These include glass optical fibers as well as fibers fabricated from organic polymers. Suitable polymeric fibers include polyacrylate optical fibers and fibers prepared from polyvinyls such as polypropylene and polyethylene. For many applications the optical fibers are located in environments in which they are exposed to extremes in temperature, humidity, and possibly high doses of ultraviolet radiation. Accordingly, the fibers must be capable of withstanding these environmental extremes and remain reliably functional. For these reasons, the preferred optical fibers utilized in the practice of the present invention are metal coated glass fibers, in which the core and the clad of the fiber comprise quartz. The metal coating provides a high degree of ruggedness and physical protection and the glass is able to withstand temperature extremes without melting or experiencing other transitions which affect their functionality.

The diameters of the fibers utilized in the interconnections of the present invention are not critical to the function of the interconnection, and fibers of any diameter are suitable. Typically, the fibers have diameters of from approximately 50 micrometers to approximately 400 micrometers. Similarly, the lengths of the optical fibers is not crucial and they can range from 1 to 12 inches (2.54 to 30.5 cm).

In the preferred embodiment of the present invention, termination portions of the metal-coated optical fibers have a solderable metal coating. As discussed further below, the solderable metal coating provides a surface for tack soldering the sleeve to the optical fibers. When metal coated glass optical fibers are utilized, the solderable metal coating can be applied directly to the outer metal coating. The type of metal which is applied to form the solderable metal coating depends upon the type of solder which is utilized to form the adhesive bond. Suitable metals include copper, gold, or copper alloys. Gold is the preferred solderable metal.

Methods known in the art for applying thin metal coatings can be utilized to form the solderable metal coating. Suitable methods include sputtering techniques, electroplating techniques, spraying methods, and dipping and wiping techniques. Since only very thin layers of solderable metal need be applied, typically on the order of 5 micrometers, electroplating the metal is particularly advantageous. Additionally, electroplating gold, the preferred coating material, is an easily used technique and produces thin uniform coatings.

In accordance with the present invention, the sleeve can be any shaped conduit-type structure which can be utilized to house the optical fibers. A particularly suitable sleeve is a capillary tubing. These are readily available in a number of different diameters and thus require no special fabrication considerations. The diameter of the sleeve depends on the diameter of the optical fibers which are being housed in the sleeve. Typical sleeve diameters range from about 55 micrometers to about 410 micrometers.

Even though sleeves fabricated from any material may find utility in the practice of the present invention, the preferred sleeve is a quartz capillary tubing having a metal coating. For reasons similar to those recited above for selecting an optical fiber, metal-coated quartz capillary tubing provides a rugged protection for the optical fibers. Additionally, in order to minimize movement and stabilize the interconnection, the diameter of the sleeve is selected so that the termination portion of the optical fibers fits very snugly within the optical fiber connection zone. When the interconnection 10 is exposed to extremes in temperature, the sleeve and the optical fibers preferably have similar coefficients of thermal expansion. This eliminates or minimizes damage to the interconnection caused by dissimilar shrinkage and expansion with temperature change.

In accordance with the present invention, the adhesive or solder 32 which provides the means for securing the termination portions of the optical fibers within the sleeve can be any suitable organic adhesive, metal solder adhesive, or solder bond. One suitable class of adhesives consists of epoxy type adhesives which form strong bonds between a variety of materials. However, since epoxies will degrade at high temperatures and their coefficients of thermal expansion are significantly different from that of metal-coated capillary tubings and metal coated optical fibers, their use is somewhat limited. The preferred means for securing the termination portions of the optical fibers within the sleeve consists of tack soldering. The term "tack soldering" is used herein in its accepted meaning to indicate a method for joining two metal substrates in which the two substrates are placed in contact and pressure and heat are applied to form a metal connection (i.e. solder bond) between the two substrates. Tack soldering is especially useful for noble metals and metals which have surface oxides, and has the added advantage that the metal surface does not have to be pre-tinned. For reasons described above, when tack soldering techniques are utilized the outer surface of the sleeve preferably has a solderable metal coating to provide a surface for effectively forming a solder bond between the two surfaces. The solderable metal coatings and methods for applying the coating can be any of those described above. Preferably the coating is gold. Alternatively, conventional solder, such as a lead-tin solder, may be used as the securing means in accordance with the present invention. In this case, the surfaces to be joined are pre-tinned before the solder operation.

Figure 2:
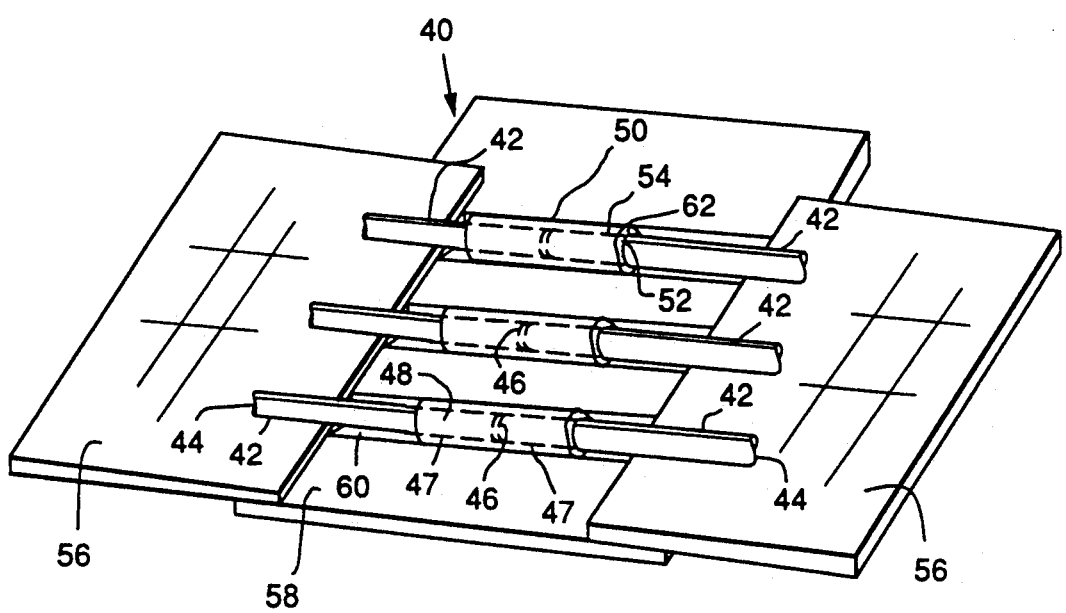
FIG. 2 is a representation of an optical interconnection in accordance with the present invention showing optical fibers embedded in a printed circuit board and optically connected within a sleeve supported on a metal foil support.

FIG. 2 is a representation of an optical interconnection in accordance with the present invention showing optical fibers embedded in printed circuits boards which are interconnected by means of the connected optical fibers. The optical interconnection 40 shown in FIG. 2 includes a plurality of optical fibers 42, each of the fibers having a first end 44, a second end surface 46, and a termination portion 47 adjacent to the second end surface 46. The optical interconnection further includes a plurality of sleeves 48, each of the sleeves having an outer surface 50 and an inner surface 52. The inner surface 52 defines an optical fiber connection zone 54 where the termination portion 47 of at least two optical fibers are housed. The end surfaces 46 of the at least two optical fibers are abutted together within the optical fiber connection zone 54. The optical interconnection 40 of the present invention shown in FIG. 2 further includes solder as the means for securing the optical fiber termination portion 47.

Also in accordance with the present invention, the first end 44 of each of the optical fibers is embedded in a printed circuit board 56. By connecting at least two optical fibers within one of the plurality of sleeves 48, interconnections are provided in which a number of printed circuit boards can interconnected.

The optical interconnection 40 further includes a foil sheet 58 which provides means for supporting the plurality of sleeves 48. In order to provide interconnections which lie flat and have a small profile, thick metal foil having a thickness on the order of 5 to 20 mils (0.013 to 0.05 cm) provides a particularly advantageous means for supporting the plurality of sleeves. Preferably the foil further has a plurality of elongated grooves 60 for receiving the plurality of sleeves 48. In order to attach the plurality of sleeves 48 in the plurality of elongated grooves 60, the optical interconnection 40 further includes tack solder or other adhesive 62 as a means for securing the plurality of sleeves 48. For reasons described above, the preferred method for securing the plurality of sleeves 48 is tack soldering. The metal foil can support a large number of sleeves in a flat configuration which is on the order of 1 to 5 inches (2.54 to 12.7 cm) wide.

A particularly suitable metal foil for supporting the plurality of sleeves is copper foil. Copper foil is readily available, is very pliable, has a suitable surface for tack soldering, and can be easily etched to form elongated grooves for receiving the individual sleeves. Many commercial chemical etching systems are available for controllably providing grooves in the foil. Among these are systems based upon ferric chloride for etching copper.

Optical fibers and sleeves which are suitable for use in the embodiment represented in FIG. 2 are the same as those described for FIG. 1 above. Additionally, the preferred optical fibers are metal coated glass fibers having a solderable metal coating and the preferred sleeve is metal coated glass capillary tubing having an outer surface with a solderable metal coating and an inner surface with a solderable metal coating.

Figure 3:
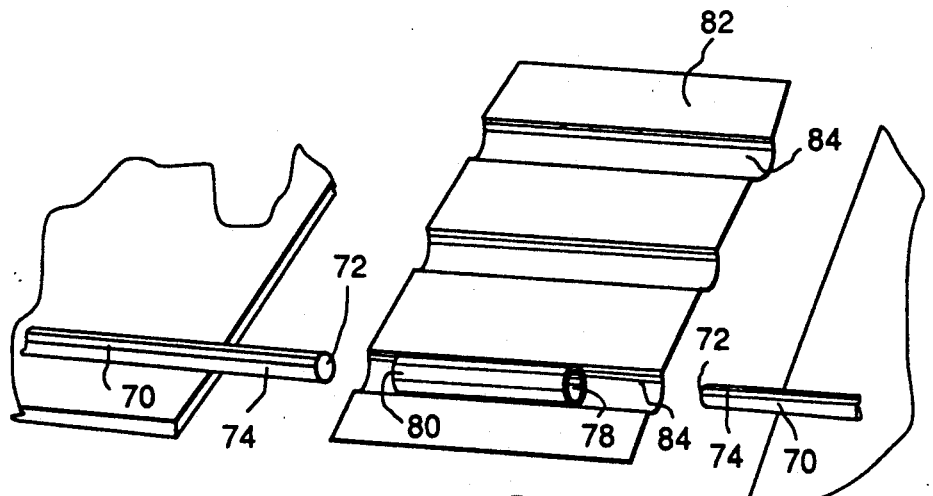
FIG. 3 is a representation of a method for preparing an optical interconnection according to the present invention.

The optical interconnections of the present invention can be formed using known assembly techniques for handling optical fibers. An exemplary method for preparing optical interconnections according to the present invention is illustrated in FIG. 3 and includes first providing optical fibers 70, and sleeves 80, each of the optical fibers having an end surface 72 and a termination portion 74 adjacent to the end surface 72. Each of the sleeves 80 has an inner surface defining a connection zone 78. The next step includes inserting the termination portion 74 of the optical fibers 70 into the connection zone 78 of the sleeve 80. The insertion is performed so that the end surfaces 72 of the optical fibers 70 are abutted together. The next step involves securing the termination portions 74 of the optical fibers 70 within the connection zone of the sleeve. As previously mentioned, the preferred securing means is an adhesive, solder, or solder bond.

A preferred method for preparing the optical interconnections of the present invention further includes providing metal foil 82 as a means for supporting the sleeve 80, and positioning the sleeve 80 on the means for supporting 82 prior to inserting the termination portion 74 of the optical fibers 70. In accordance with the present invention it is also preferable to etch elongated grooves 84 in the metal foil 82 to receive the sleeve 80.

As mentioned above, preferred optical fibers are metal coated glass fibers and the termination portion has a solderable metal coating. The sleeve is preferably a metal-coated quartz capillary tubing and the outer surface has a solderable metal coating. Inserting the metal-coated optical fibers into the capillary tubing can be accomplished using methods and tools for handling micro and small sized components. When metal foil 82, such as copper foil having etched elongated grooves, is used as a support, the capillary tubing can be positioned within elongated grooves before inserting the optical fibers into the capillary tubing. This provides a stable support for the capillary tubing sleeves and aids in inserting the optical fibers into the sleeves.

After positioning the sleeve 80 or capillary tubing within the elongated grooves, the next step includes securing the capillary tubes to the foil support. This step can be accomplished using those methods described above for securing the optical fiber within the capillary tubing including applying organic polymeric adhesives or solder, or tack soldering. When copper foil is the means for supporting metal coated optical fibers having a solderable metal coating, tack soldering is particularly suitable.

Securing the termination portions of the optical fibers to the sleeves is also accomplished utilizing suitable adhesives or tack soldering. Techniques for applying organic polymeric adhesives and for tack soldering small and micro components are well known in the art and can be utilized in the practice of this invention. For most applications, tack soldering is preferred because the solder bond provides excellent adhesive bonds and can withstand extremes in temperature and humidity. This is a particularly desirable characteristic when the interconnections of the present invention are utilized in aerospace applications such as on aircraft wings and space vehicles.

Generally when tack soldering techniques are utilized, the outer surface of the sleeve or capillary tubing and the termination portions of the optical fiber are electroplated with a layer of gold having a thickness of approximately 5 micrometers, prior to preparing the optical interconnections. Gold provides an excellent surface for tack soldering reliable bonds; however, other metals, such as copper, platinum and copper alloys can also be used. Additionally, when printed circuit boards are interconnected in accordance with the present invention, they are preferably tack soldered to the metal foil support, e.g. copper foil, to provide additional support and stress relief to the interconnection.

Sleeves, preferably in the form of capillary tubing, are central to the optical interconnections of the present invention. These sleeves provide a means to simply and accurately align and connect optical fibers. The interconnections lie flat and require very little space. Additionally, large numbers of optical fibers having one end embedded in a printed circuit board can be connected to interconnect arrays of circuit boards without using bulky interconnect packaging. As a feature of the present invention, the connected optical fibers can be easily disconnected by removing the solder or adhesive in a nondestructive manner. This allows optical fibers and printed circuit boards to be easily interchanged in the field without destroying board components or optical fibers. This is particularly applicable in "smart skin" technology where large panels embedded with optical fibers and sensors are interconnected.

The following non-limiting example illustrates a method for fabricating an optical interconnection in accordance with the present invention.

EXAMPLE

An optical interconnection in which two printed circuit boards were interconnected by connecting two optical fibers was prepared as follows.

A piece of 5 mil (0.013 cm) thick copper foil with dimensions measuring 1 inch by 2 inches (2.54 cm by 5.08 cm) was etched with ferric chloride solution to form an elongated groove in the foil. Next a length of aluminum-coated glass capillary tubing, approximately 125 micrometers in diameter, was gold electroplated on the outer surface and then tack soldered in the etched elongated groove.

The termination portions of two optical fibers, each comprising a quartz fiber with an aluminum coating and each embedded in separate printed circuit boards, were gold electroplated and then inserted inside the capillary tubing so that the ends of the optical fibers were abutted together. Then the optical fibers were tack soldered in place within the capillary tubing to secure them and assure that the two ends remain abutted together.

In order to further support the interconnections and relieve stress on the interconnections, the copper foil was tack soldered to four different sites on each printed circuit board.

While the previous discussion has focused on the application of the present invention to the interconnection of optical fibers which are attached to a printed circuit board, the present invention is not so limited. Rather, the present invention may be used to interconnect optical fibers which are embedded in any type of structure which may or may not incorporate electronic circuitry, including, but not limited to, flexible panels, cables, and circuits.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is limited only by the following claims.

What is claimed is:

1. An optical interconnection comprising:
   a first optical fiber having at least one end surface and a termination portion adjacent to said end surface;
   a second optical fiber having at least one end surface and a termination portion adjacent to said end surface;
   a sleeve having an outer surface and an inner surface and a uniform diameter along the length of said inner surface, said inner surface defining an optical fiber connection zone wherein said termination portions of said first and second optical fibers are housed and wherein said first and second optical fiber end surfaces are abutted together; and
   means for securing the termination portions of said first and second optical fibers to said outer surface of said sleeve to thereby secure said end surfaces of said first and second optical fibers in abutment within said connection zone.

2. The optical interconnection of claim 1 wherein said optical fiber is selected from the group consisting of glass fibers and organic polymeric fibers.

3. The optical interconnection of claim 1 wherein said optical fibers are metal-coated glass fibers.

4. The optical interconnection of claim 1 wherein said optical fiber termination portions have a solderable metal coating.

5. The optical interconnection of claim 4 wherein said solderable metal coating is gold.

6. The optical interconnection of claim 1 wherein said sleeve is metal-coated glass capillary tubing.

7. The optical interconnection of claim 1 wherein said outer surface of said sleeve has a solderable metal coating.

8. The optical interconnection of claim 1 wherein said means for securing said termination portions is selected from the group consisting of solder and organic based adhesives.

9. The optical interconnection of claim 7 wherein said solderable metal coating is gold.

10. An optical interconnection for interconnecting printed circuit boards, said interconnection comprising:
    a plurality of optical fibers, each of said optical fibers having a first end, a second end surface, and a termination portion adjacent to said second end surface;
    a plurality of sleeves, each of said sleeves having an outer surface and an inner surface and a uniform diameter along the length of said inner surface, said inner surface defining an optical fiber connection zone wherein said termination portions of at least two optical fibers are housed, and wherein said end surfaces of said at least two optical fibers are abutted together; and means for securing said termination portions of said two optical fibers to said outer surface of said sleeve to thereby secure said end surfaces of said two optical fibers in abutment within said connection zone.

11. The optical interconnection of claim 10 wherein said first end of said optical fibers is embedded in a printed circuit board.

12. The optical interconnection of claim 10 further comprising a means for supporting said plurality of sleeves.

13. The optical interconnection of claim 12 wherein said support means is copper foil.

14. The optical interconnection of claim 13 wherein said copper foil has elongated grooves for receiving said sleeves.

15. The optical interconnection of claim 14 wherein said sleeves are metal-coated glass capillary tubing and wherein said outer surfaces of said sleeves have a solderable metal coating.

16. The optical interconnection of claim 15 wherein said solderable metal coating is gold.

17. The optical interconnection of claim 16 further including a means for securing said means for supporting said sleeves, to said sleeves.

18. The optical interconnection of claim 17 wherein said means for securing comprises a solder bond.

19. The optical interconnection of claim 15 wherein said metal coating is a coating selected from the group consisting of sputter coatings and electroplated coatings.

20. The optical interconnection of claim 10 wherein said optical fibers are metal coated glass fibers.

21. The optical interconnection of claim 20 wherein said means for securing said termination portion of said optical fibers comprises a solder bond.

22. A method for forming an optical interconnection for connecting optical fibers, said method comprising the steps of:

providing optical fibers and optical fiber sleeves, each of said optical fibers having an end surface and a termination portion adjacent to said end surface, and each of said sleeves having an outer surface, and an inner surface of uniform diameter along the length thereof and defining a connection zone;

inserting said termination portions into said connection zone such that said end surfaces of said optical fibers are abutted together;

securing said termination portions of said optical fibers to said outer surface of said sleeve to thereby secure said end surfaces of said optical fibers in abutment within said connection zone.

23. The method of claim 22 further including the steps of providing an optical fiber support means and positioning said optical fiber sleeve on said support means.

24. The method of claim 23 wherein said support means is copper foil of approximately 5 mils (0.013 cm) thickness.

25. The method of claim 24 further including the step of etching elongated grooves in said copper foil.

26. The method of claim 23 further including the step of securing said optical fiber sleeve to said support means.

27. The method of claim 22 wherein said optical fibers are metal coated glass fibers and said sleeves are metal-coated glass capillary tubing.

28. The method of claim 27 further including the step of gold electroplating said termination portion of said optical fibers prior to said inserting.

29. The method of claim 28 wherein said metal-coated glass capillary tubing has an outer surface, and further including the step of gold electroplating said outer surface prior to said inserting.

30. The method of claim 29 wherein said securing said termination portions comprises tack soldering said termination portion to said sleeve.

31. The method of claim 23 wherein said optical fibers are embedded in printed circuit boards and further including the step of tack soldering said support means to said printed circuit boards.

* * * * *